United States Patent Office 3,523,137
Patented Aug. 4, 1970

3,523,137
PREPARATION OF DIAMIDOADAMANTANE COMPOUNDS FROM DIHALOADAMANTANES
Robert E. Moore, Wilmington, Del., assignor to Sun Oil Company, Philadelphia, Pa., a corporation of New Jersey
No Drawing. Continuation-in-part of application Ser. No. 450,169, Apr. 22, 1965. This application Apr. 16, 1968, Ser. No. 721,595
Int. Cl. C07c *103/08*
U.S. Cl. 260—558                                    20 Claims

ABSTRACT OF THE DISCLOSURE

Dichloro or dibromo derivatives of adamantane or alkyladamantanes are converted in high yield to 1,3-diamidoadamantanes by reaction in fuming sulfuric acid of 102–120% $H_2SO_4$ equivalent with cyano compounds of the group embracing HCN and RCN where R is a hydrocarbyl radical having 1–19 carbon atoms.

CROSS REFERENCE TO RELATED APPLICATION

This application is a continuation-in-part of copending application Ser. No. 450,169, filed Apr. 22, 1965 now abandoned.

This invention relates to the preparation of 1,3-diamidoadamantanes from dibromo or dichloro derivatives of adamantane and alkyladamantanes by reaction thereof with cyano compounds in the presence of fuming sulfuric acid.

The adamantane nucleus has ten carbon atoms, four of which are bridgehead carbons that are equivalent to each other, as can be seen from the following typographical representation:

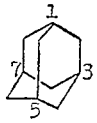

As shown, the bridgehead carbon atoms customarily are designated by the numerals 1, 3, 5 and 7 respectively.

The 1,3-diamido compounds prepared in accordance with the invention contain an adamantane group consisting of an adamantane nucleus or an alkyladamantane moiety in which either one or two alkyl groups are attached to the adamantane nucleus either at bridgehead or nonbridgehead positions. The total number of carbon atoms in the alkyl substituent group or groups is in the range of 1–10 inclusive. The diamido compounds correspond to the formula:

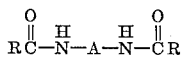

in which A is a group having an adamante nucleus and 0–2 alkylsubstituents having not more than 10 total carbon atoms, R is either hydrogen or a $C_1$–$C_{17}$ hydrocarbyl radical of the class consisting of alkyl, aryl (including alkaryl) and aralkyl. In these compounds each amido group is attached to a bridgehead carbon of the adamantane nucleus; hence the compounds are all 1,3-derivatives of the adamantane hydrocarbon to which they correspond.

The foregoing class of the compounds which can be prepared according to the invention includes compounds in which the adamantane nucleus has substituents at each bridgehead carbon atom and hence contains no tertiary hydrogen atoms. The substituents at the 1- and 3-positions are the amido groups and those at the 5- and 7-positions are alkyl groups having a total of from 2 to 10 carbon atoms. Such alkyl groups can be methyl, ethyl, propyl, butyl or the like. The compounds within this subclass are 1,3-diamido-5,7-dialkyladamantanes in which the amido groups correspond to

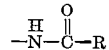

as defined above. Preferred compounds within this subclass are those in which the two alkyl groups each are methyl and each diamido group is formamido, acetamido or benzamido.

The compounds of the present invention are prepared from dibromo or dichloro derivatives of adamantane or alkyladamantanes in which the halogen atoms originally can be attached to the adamantane nucleus at either bridgehead or nonbridgehead positions or both. Mixtures of bridgehead and nonbridgehead dihalo compounds can be used if desired. These dihalo compounds are reacted either with HCN or with RCN, wherein R is a $C_1$–$C_{17}$ hydrocarbyl radical as above specified, in the presence of fuming sulfuric acid having a strength in the range of 102–120% $H_2SO_4$ equivalent, preferably 102–110%. After the dihalo and cyano compounds have reacted, the resulting reaction mixture is admixed with water and the desired diamido compound is thereupon formed by a hydrolysis or solvolysis reaction. The product which is recovered from the reaction mixture is the 1,3-diamido derivative of adamantane or alkyladamantane even in cases where one or both of the halogen atoms in the original dihalo compound was or were attached to the nucleus at a nonbridgehead position. This result is obtained due to the fact that the strong sulfuric acid used to effect the conversion will rapidly isomerize any nonbridgehead halo group to a bridgehead position of the adamantane nucleus. Hence either or both halogen atoms in the starting adamantane compound can be attached to a nonbridgehead carbon and the reaction product will be precisely the same (i.e., the 1,3-diamido derivative) as when a 1,3-dihaloadamantane compound is used. Alkyl groups on the adamantane nucleus are not affected during the reaction and remain in their original position, whether it be bridgehead or nonbridgehead.

By way of example of the invention, 1,3-dibromo-3,5-dimethyladamantane is reacted with acetonitrile in the presence of fuming sulfuric acid (e.g., 103% $H_2SO_4$ equivalent) and the reaction product is then diluted with water. The product is 1,3-diacetamido-3,5-dimethyladamantane obtained in the form of white crystals. The reactions which occur in forming this product can be illustrated as follows:

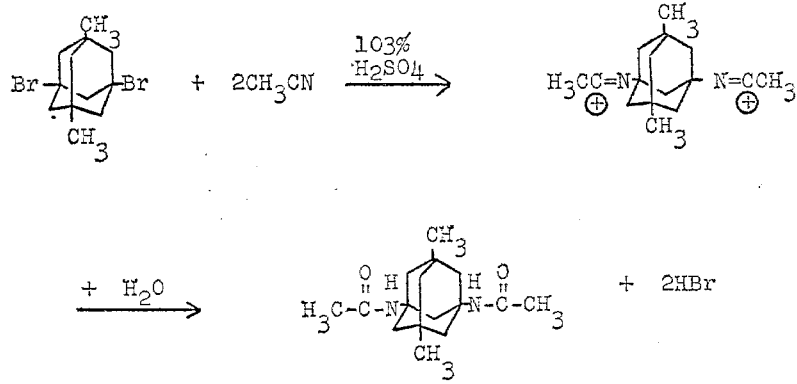

As indicated the acetonitrile reacts at each site of the bromine atoms by what appears to be a carbonium ion mechanism and apparently produces at each site an intermediate

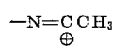

carbonium ion group. In this initial reaction the bromine atoms become bound or taken up by the fuming sulfuric acid in some manner. In order to obtain the desired product it is essential to dilute the acid solution with a large amount of water in order to allow hydrolysis or solvolysis to proceed to form the two amido groups. When the reaction mixture is diluted with sufficient water, the 1,3-diacetamido-5,7-dimethyladamantane precipitates as white crystals and can be separated by filtration.

As another specific example, 1,3-dichloro-5,7-dimethyladamantane is reacted in the presence of fuming sulfuric acid (e.g., 105% $H_2SO_4$ equivalent) with hydrogen cyanide generated in situ by addition of NaCN to a mixture of the dichloro compound and the fuming acid. The mixture is then diluted with water and 1,3-diformamido-5,7-dimethyladamantane is produced. In this case the diamido product is soluble in the aqueous sulfuric acid and does not precipitate. It can be extracted therefrom by a suitable solvent such as benzene or ether.

The following is a specific example illustrating the use of a mixture of dihaloalkyladamantane having, respectively, one and two nonbridgehead halogen atoms. Specifically, a mixture of 0.5 mole of 1,4-dichloro-3-ethyl-7-n-propyladamantane and 0.5 mole of 2,3-dichloro-1-n-propyl-5-ethyladamantane is reacted at 5° C. in 50 moles of 103% $H_2SO_4$ with 2.0 moles of 4-phenylbenzonitrile. The product is 1,3 - bis(4-phenylbenzamido)-5-n-propyl-7-ethyladamantane, and the reaction producing it can be depicted by the following equation:

rine atoms, the amido groups resulting from the reaction are both located at bridgehead positions. Thus the product is the same as would have been obtained by starting with a dibridgehead dichloro compound.

The dihalo reactant in the present process can be a dibromo or dichloro derivative of adamantane itself or of any alkyladamantane having attached to the adamantane nucleus 1–2 alkyl groups containing 1–10 total carbon atoms. The two halogen atoms are attached to the adamantine nucleus and can be attached to bridgehead and/or nonbridgehead carbon atoms of the nucleus. Examples of such reactants are the dibromo or dichloro derivatives of the following hydrocarbons (the halo groups being on the nucleus): adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; and 1-n-decyladamantane. Dihalo derivatives such as these and others as herein specified for practicing the invention are derivable from the corresponding hydrocarbons as discussed below.

Dibromo and dichloro derivatives of adamantane, including both bridgehead and nonbridgehead dihaloadamantane, can be prepared by reacting chlorine or bromine with adamantane as disclosed in the following references: Stetter and Wulff German Pat. No. 1,101,410; Stetter, Angew. Chem. internat. Edit., vol. 1 (1962), No. 6, pages 287–288; and Smith and Williams, J. Org. Chem., 26, pages 2207–8 (1961). Bridgehead dibromo and dichloro derivatives of alkyladamantanes similarly can be prepared by reacting bromine or chlorine with the alkyladamantane in the presence of $AlBr_3$ or $AlCl_3$ as catalyst. Halogenation preferentially at bridgehead positions tends to occur, although some amount of other halogenated derivatives may be formed. The 1,3-dihalo products can, if desired,

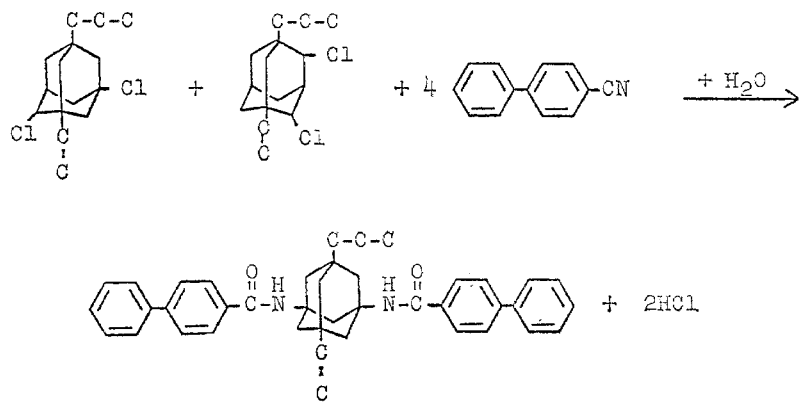

As shown by the equation, even though the starting dichloro material contains one or two nonbridgehead chlorine atoms, the amido groups resulting from the reaction be separated from other halogenation products by fractional distillation and/or crystallization.

Another route for obtaining dichloro or dibromo alkyladamantanes is by conversion of the hydrocarbon first to diol derivatives and then converting these to the corresponding dibromo or dichloro derivatives by well known reaction procedures. In this fashion dihalo alkyladamantanes can be prepared which are either nonbridgehead or bridgehead derivatives including both monobridgehead and dibridgehead dihaloalkyladamantanes. The following description shows more specifically how this can be done.

The preparation of alkyladamantanes from which the diols can be made can be effected by known procedures such as those described, for example, in the following: U.S. Pat. 3,128,316; U.S. Pat. 3,275,700; U.S. Pat. 3,336,405; U.S. Pat. 3,336,406; U.S. Pat. 3,356,751; Schneider United States application Ser. No. 613,443, filed Feb. 2, 1967 now U.S. Pat No. 3,382,288. Spengler et al., Erdöl und Kohle-Erdgas-Petrochemie, 15, 702–707 (1962); and Hoek et al., 85, (1966) Recueil 1045–1053.

Conversion of the alkyladamantanes to bridgehead diols can be achieved by catalytically oxidizing the hydrocarbon with air in the manner described in Schneider U.S. Pat. No. 3,356,741, or by reacting the hydrocarbon with chromic acid in the manner taught in Moore United States application Ser. No. 664,311, filed Aug. 30, 1967 now U.S. Pat. No. 3,383,424. In the air oxidation procedure described in Pat. No. 3,356,741, part of the oxidation product is the 1,3-dihydroxy derivative of the alkyladamantane feed. Another part is composed of ketohydroxy derivatives thereof in which the keto group is located on the nucleus necessarily at a nonbridgehead carbon and the hydroxy group is located at both bridgehead and nonbridgehead carbons. These ketohydroxy products can be hydrogenated by procedures disclosed in the patent to convert the keto to a second hydroxyl group. The resulting hydrogenated product thus would constitute nonbridgehead diols some of which would have one nonbridgehead hydroxy group and others two such nonbridgehead groups.

Alkyladamantane diols prepared in the above manner can be converted to the corresponding dichloro or dibromo derivatives by conventional procedures for replacing an —OH by a halogen substituent, such as those described by Wagner and Zook in "Synthetic Organic Chemistry," pages 91–92 (1953). For example, the diol can be reacted in pyridine with either $SOCl_2$, $POCl_3$ or $PBr_3$. These procedures will substitute halogen for the —OH group without shifting the position of the substituent on the adamantane nucleus. Thus bridgehead and/or nonbridgehead dihaloalkyladamantanes corresponding to the diols used can be formed in this manner. All of these dihaloalkyladamantanes are equivalent feed materials for purposes of the present invention and they all give the dibridgehead diamido product.

The cyano reactant for the present process can be hydrogen cyanide or any alkyl, aryl (including alkaryl) or aralkyl mononitrile having 2–18 total carbon atoms. In other words, representing the cyano reactant as RCN, R can be hydrogen or any hydrocarbyl group selected from $C_1$–$C_{17}$ alkyl groups, $C_6$–$C_{17}$ aryl groups and $C_7$–$C_{17}$ aralkyl groups. Any such cyano compound can be used in the process and the R group in each amido moiety

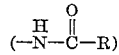

of the diamido product will be the same as the R in the starting RCN reactant.

The preferred cyano reactants are acetonitrile, benzonitrile and HCN. When hydrogen cyanide is used as the cyano compound, it can be generated in situ by adding NaCN or KCN to the mixture of dihaloadamantane compound and sulfuric acid.

Examples of other suitable RCN reactants where R is alkyl of the $C_1$–$C_{17}$ range are the following: propanenitrile; butanenitrile; 2-methyl-butanenitrile; octanenitrile; dodecanenitrile; and octadecanenitrile (i.e., stearonitrile). The following are other examples of RCN reactants wherein R is aryl of the $C_6$–$C_{17}$ range: o-tolunitrile; m-ethylbenzonitrile; p-isopropylbenzonitrile; p-n-hexylbenzonitrile; p-n-undecylbenzonitrile; 1-naphthonitrile; 6-methyl-2-naphthonitrile; 7-hexyl-2-naphthonitrile; 3-phenanthronitrile; 3-ethyl-9-phenanthronitrile; and the like. The following are a few examples of cyano reactants wherein the R group is aralkyl of the $C_7$–$C_{17}$ range: benzylcyanide; benzylacetonitrile; 2-phenylbutanenitrile; 2-m-tolyldecanenitrile; 2-phenylbutanenitrile; 4-biphenylnitrile; 2-m-tolyldecanenitrile; 4-biphenylacetonitrile; 2-(6-methylanthracyl)acetonitrile; and 4-(2-benzonaphthyl)butanenitrile. Any of the foregoing or any analogous cyano compounds of the ranges specified can be used in practicing the invention, and the R group in the resulting diamido product will be the same as the R group in the cyano reactant.

In reacting the cyano compound with the dihaloadamantane compound fuming sulfuric acid having a strength in the range of 102–120% $H_2SO_4$ equivalent by weight is employed and the strength of the fuming acid preferably is in the range of 102–110% $H_2SO_4$. The amount of fuming acid used should be such that the molar ratio of $H_2SO_4$ to the dihaloadamantane compound is at least 10:1 and more preferably at least 20:1.

The amount of the cyano compound used should be such that at least one molecule of it is available to react at the site of each halogen atom or in other words that the molar ratio of the cyano compound to the dihaloadamantane compound is at least 2:1. An excess of the cyano compound over this ratio is not detrimental and a ratio of say 3:1 typically can be used.

In carrying out the present process the dihaloadamantane compound preferably is first dissolved in the fuming sulfuric acid in a proportion such that the molar ratio of $H_2SO_4$ to the dihalo compound is as above specified. This can be done merely by adding the dihalo compound to the sulfuric acid at room temperature and stirring for several minutes. As the compound goes into solution some release of heat occurs but the exotherm is relatively mild. In cases where a dibromo compound has been used as reactant, the resulting solution has a deep red or maroon color. After the dihalo reactant has been dissolved, the cyano compound is added to the mixture while agitating the same and reaction takes place as indicated by the initial step of the first equation given above. This reaction can be carried out at any temperature between the freezing point of the reaction mixture to its boiling point, e.g., from −20° C. to 80° C., and usually will be conducted at about room temperature. When an aromatic nitrile is used that has a ring not attached to the cyano group, as in the case of naphthonitriles, phenanthronitriles, phenanthronitriles or biphenylnitriles, it is generally desirable to carry out the reaction at a relatively low temperature (e.g., 0–10° C.) to minimize the possibility of side reactions. When NaCN or KCN is used to generate HCN in situ as the cyano reactant, the temperature generally should be maintained substantially below 26° C. to prevent the HCN from boiling off or else the reaction should be carried out under pressure. With either HCN or RCN as the cyano reactant the reaction generally will be complete within thirty minutes reaction time.

After the first phase of the overall reaction has been completed, the mixture is admixed with a relatively large volume of water to effect hydrolysis or solvolysis and produce the desired diamido product. Preferably this is done by pouring the strongly acidic mixture over cracked ice to effect dilution while simultaneously preventing the temperature from rising an inordinate amount. Enough water (ice) should be used to adequately decrease the strength of the sulfuric acid so that hydrolysis or solvolysis will occur and the diamino product will precipitate except in the case of the diformamido products which, as previously pointed out, tend to be soluble in the diluted acid. Generally the acid strength after dilution should be less than 50% $H_2SO_4$ and more preferably less than 20%. After the final reaction has been effected, the precipitated diamido product can be separated from the mixture by filtration or in the case of diformamido products separation can be effected by extraction with a suitable hydrocarbon or ether solvent.

The following examples are specific illustrations of the invention:

EXAMPLE I

This example shows the preparation of 1,3-diacetamido-5,7-dimethyladamantane. To 35 ml. of fuming sulfuric acid having a strength of 103% $H_2SO_4$ equivalent by weight and cooled to about 10° C., 3.22 g. (0.01 mole) of 1,3-dibromo-5,7-dimethyladamantane in powder form are added and the mixture is stirred to dissolve the dibromo compound in the fuming acid. The resulting solution has a deep red or maroon color. The molar ratio of $H_2SO_4$ equivalent to dibromo compound is about 68:1. The mixture is maintained at about 10° C. and is stirred while 2.1 g. (0.05 mole) of acetonitrile are added slowly thereto over a period of 15 minutes, following which the mixture is stirred for 30 minutes additionally to insure completion of the reaction. The molar ratio of acetonitrile to the dibromo compound is approximately 5:1. The reaction mixture is then poured slowly over 300 g. of cracked ice, whereupon melting of the ice and the resulting dilution of the acid solution causes hydrolysis to take place to form the diacetamido product in the form of a finely divided precipitate. In this reaction with water the color of the mixture changes to light amber. The mixture is filtered and the residue is washed with acetone and dried. A white crystalline product is obtained in amount of 2.56 g. This product is determined by vapor phase chromatography, infrared and nuclear magnetic resonance analyses to be substantially pure 1,3-diacetamido-5,7-dimethyladamantane. It has a melting point of 315° C. and the yield thereof is 92% based on theory.

EXAMPLE II

This example shows the preparation of 1,3-diformamido-5,7-dimethyladamantane. It is carried out in generally the same way as the preceding example except that powdered NaCN in stead of acetonitrile is added to the acid solution of the dibromo compound. The NaCN is added over a period of 2 hours in amount of 7.5 g. and it reacts with the sulfuric acid to form HCN which in turn reacts with the dibromo compound in the manner herein described. The molar ratio of HCN generated to the dibromodimethyladamantane is about 6:1. More heat is released during this reaction than in the case of acetonitrile and the temperature of the mixture tends to rise. In this reaction $Na_2SO_4$ is formed and it tends to cause the mixture to be gelatinous if a low temperature is maintained. Hence after the addition of all the NaCN, the temperature is allowed to rise to room temperature level and the mixture is stirred for one-half hour. Upon dilution as in Example I. The diamido product is formed, but remains in solution. It is extracted therefrom by means of a 50:50 mixture of ether and benzene, the resulting solution is water washed and then dried via $Na_2SO_4$ and the solvent is evaporated. The resulting product has a melting point of 185° C. and is identified by VPC, IR and NMR as 1,3-diformamido-5,7-dimethyladamantane. The yield based on theory is about 85%.

EXAMPLE III

When Example II is repeated except that HCN itself is added to the acid solution of the 1,3-dibromo-5,7-dimethyladamantane and the reaction temperature is maintained at about 10° C. until the reaction is complete, 1,3-diformamido-5,7-dimethyladamantane is obtained in a yield above 90% based on theory.

EXAMPLE IV

When Example I is repeated except that benzonitrile is substituted for acetonitrile, 1,3-dibenzamido-5,7-dimethyladamantane is obtained in a yield above 90%. The product is a white crystalline powder having a melting point of 250–251° C.

EXAMPLE V

This example is included for purpose of comparison with Example I and illustrates the importance of using fuming acid as herein specified. The present run was carried out approximately in the same manner as Example I except that 100% $H_2SO_4$ was used (instead of 103% $H_2SO_4$). Specifically, to 35 ml. of sulfuric acid having a strength of 100% $H_2SO_4$ and cooled to about 10° C., 3.22 g. (0.01 mole) of 1,3-dibromo-5,7-dimethyladamantane in powder form were added and the mixture was stirred to dissolve the dibromo compound. The molar ratio of $H_2SO_4$ to dibromo compound was about 60:1. The mixture was maintained at about 10° C. and was stirred while 2.1 g. (0.05 mole) of acetonitrile were added slowly thereto over a period of 15 minutes, following which the mixture was stirred for 30 minutes additionally to insure completion of the reaction. The molar ratio of acetonitrile to the dibromo compound was approximately 5:1. The reaction mixture was then poured slowly over 300 g. of cracked ice and the ice was allowed to melt. The resulting mixture was filtered and the residue was washed with water to remove residual sulfuric acid and was dried. The residue was a light tan powder which melted over the range of 178–185° C. This material was treated with boiling n-hexane and a small amount of unreacted 1,3-dibromo-5,7-dimethyladamantane was thereby extracted. The resulting mixture was filtered and the residue was dried, yielding a white powder having a sharp melting point of 187° C. This was the only reaction product found in the reaction mixture. Since the diacetamido product of Example I had a melting point of 315° C., the 187° C. melting point of the present product showed that it was a different compound. Specifically, the latter proved to be 1-hydroxy-3-acetamido-5,7-dimethyladamantane. This shows that the use of fuming acid of a strength substantially above 100% $H_2SO_4$, as herein specified, is essential for securing the desired diamido product.

When dibromoadamantane or the dibromo derivatives of other alkyladamantanes as herein specified are used in place of 1,3-dibromo-5,7-dimethyladamantane, similar results are obtained as in the preceding examples. Likewise when the corresponding dichloro derivatives are used in place of the dibromo compounds, substantially the same results are secured. Furthermore when cyano compounds as above specified other than HCN, acetonitrile or benzonitrile are used in practicing the invention, substantially analogous results are obtained.

The diamidoadamantane compounds prepared according to the present invention can be converted to diaminoadamantanes by acid or base hydrolysis, which compounds can be polymerized with diacids. Hence the products prepared according to the present invention have utility in the manufacture of polyamides which can be used in the manufacture of fibers and films.

The diamidoadamantane compounds are also useful for incorporation into polyolefins such as polyethylene or polypropylene, to function as antistatic agents for fibers or molded articles or as slip agents when the polymer is extruded as film. The use of slip agents in polymer extrusion processes is advantageous in that it facilitates the extrusion operation and gives a smoother extruded product.

Heretofore in the prior art as disclosed by Stetter and Wulff, Chem. Ber., vol. 93, page 1366 (1960), 1,3-diacetamidoadamantane has been prepared from a mixture of 1,3-dibromoadamantane, silver sulfate and acetonitrile in the presence of concentrated (96%) sulfuric acid. With acid of such strength, the presence of silver sulfate in the reaction mixture is essential as otherwise the diacetamido product will not be obtained. The present method of making 1,3-diamidoadamantane compounds is distinctly advantageous over such prior art method in that the present method does not require the use of an expensive silver salt as the former method does. It is further advantageous in that higher yield of the diamido product can readily be obtained. For example, a yield of 70% of the theoretical was obtained according to the aforesaid prior art reference whereas the present method is capable of giving yields in excess of 90% on theory.

The invention claimed is:
1. Method of preparing a 1,3-diamidoadamantane compound corresponding to the formula

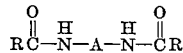

wherein A is a group having an adamantane nucleus and 0–2 alkyl substituents having not more than 10 total carbon atoms, R is a radical selected from the group consisting of hydrogen and hydrocarbyl radicals selected from $C_1$–$C_{17}$ alkyl radicals, $C_6$–$C_{17}$ aryl radicals and $C_7$–$C_{17}$ aralkyl radicals, and each amido group is attached to the adamantane nucleus at a bridgehead position, which comprises:
 (a) dissolving a dihalogenated adamantane or alkyladamantane, wherein the two halogen substituents are selected from chlorine and bromine and are each attached to the adamantane nucleus and wherein the alkyl groups number 0–2, have not more than 10 total carbon atoms and are each attached to said nucleus, in fuming sulfuric acid having a strength in the range of 102–120% $H_2SO_4$ equivalent by weight, the molar ratio of $H_2SO_4$ to said dihaloadamantane compound being at least 10:1;
 (b) reacting the mixture at a temperature in the range of —20° to 80° C. with a cyano compound selected from the group consisting of HCN and RCN wherein R is a $C_1$–$C_{17}$ hydrocarbyl radical as above specified, the molar ratio of the cyanocompound to said dihaloadamantane compound being at least 2:1;
 (c) mixing the reaction mixture with water;
 (d) and separating said 1,3-diamidoadamantane compound from the resulting mixture.
2. Method according to claim 1 wherein the molar ratio of $H_2SO_4$ to said dihaloadamantane compound is at least 20:1.
3. Method according to claim 1 wherein said cyano compound is RCN wherein R is an alkyl group.
4. Method according to claim 3 wherein said cyano compound is acetonitrile.
5. Method according to claim 1 wherein said cyano compound is benzonitrile.
6. Method according to claim 1 wherein said cyano compound is HCN.
7. Method according to claim 1 wherein said strength corresponds to 102–110% $H_2SO_4$ equivalent by weight.
8. Method according to claim 1 wherein each halogen atom of the dihaloadamantane compound is attached to the adamantane nucleus at a bridgehead position.
9. Method of preparing a 1,3 - diacetamidoalkyladamantane which comprises:
 (a) dissolving a dihaloalkyladamantane, in which the halogen atoms are selected from the group consisting of bromine and chlorine and in which to the adamantane nucleus are attached the two halogen atoms and 1–2 alkyl groups containing 1–10 total carbon atoms, in fuming sulfuric acid having a strength in the range of 102–110% $H_2SO_4$ equivalent by weight, the molar ratio of $H_2SO_4$ to said dihaloalkyladamantane being at least 10:1;
 (b) reacting the mixture at a temperature in the range of —20° to 80° C. with acetonitrile used in amount of at least 2 moles per mole of dihaloalkyladamantane;
 (c) mixing the reaction mixture with water;
 (d) and separating 1,3 - diacetamidoalkyladamantane from the resulting mixture.
10. Method according to claim 9 wherein said dihaloalkyladamantane is 1,3-dibromodimethyladamantane.
11. Method according to claim 9 wherein said dihaloalkyladamantane is 1,3-dichlorodimethyladamantane.
12. Method according to claim 9 wherein said ratio of $H_2SO_4$ to dihaloalkyladamantane is at least 20:1.
13. Method of preparing a 1,3 - diformamidoalkyladamantane which comprises:
 (a) dissolving a dihaloalkyladamantane, in which the halogen atoms are selected from the group consisting of bromine and chlorine and in which to the adamantane nucleus are attached the two halogen atoms and 1–2 alkyl groups containing 1–10 total carbon atoms, in fuming sulfuric acid having a strength in the range of 102–110% $H_2SO_4$ equivalent by weight, the molar ratio of $H_2SO_4$ to said dihaloalkyladamantane being at least 10:1;
 (b) reacting the mixture at a temperature in the range of —20° to 80° C. with HCN used in amount of at least 2 moles per mole of dihaloalkyladamantane;
 (c) mixing the reaction mixture with water;
 (d) and separating 1,3-diformamidoalkyladamantane from the resulting mixture.
14. Method according to claim 13 wherein said dihaloalkyladamantane is 1,3-dibromodimethyladamantane.
15. Method according to claim 13 wherein said dihaloalkyladamantane is 1,3-dichlorodimethyladamantane.
16. Method according to claim 13 wherein said ratio of $H_2SO_4$ to dihaloalkyladamantane is at least 20:1.
17. Method according to claim 1 wherein the dihaloadamantane compound has, attached to the adamantane nucleus, each halogen atom at a bridgehead position and 1–2 alkyl radicals.
18. Method according to claim 17 wherein each alkyl radical is independently selected from methyl and ethyl radicals.
19. Method according to claim 17 wherein said cyano compound is acetonitrile, benzonitrile or HCN.
20. Method according to claim 19 wherein each alkyl radical is independently selected from methyl and ethyl radicals.

References Cited

Stetter et al., Chem. Ber., vol. 93, p. 1366 (1960).

JOHN D. RANDOLPH, Primary Examiner

H. I. MOATZ, Assistant Examiner

U.S. Cl. X.R.

252—8.8; 260—78, 45.9, 94.9, 561, 563